United States Patent [19]

Schmitter et al.

[11] 3,947,385

[45] Mar. 30, 1976

[54] MIXTURES CONTAINING PREPOLYMERS, WHICH CAN BE CONVERTED TO HEAT-RESISTANT FOAMED PLASTICS

[75] Inventors: André Schmitter, F-Hegenheim, France; Jürg Kiefer, Reinach; Theobald Haug, Frenkendorf, both of Switzerland

[73] Assignee: Ciba-Geigy Corporation, Ardsley, N.Y.

[22] Filed: Jan. 10, 1975

[21] Appl. No.: 540,026

[30] Foreign Application Priority Data
Jan. 16, 1974 Switzerland.......................... 572/74

[52] U.S. Cl. ......... 260/2.5 N; 260/2.5 R; 260/47 P; 260/47 UA; 260/47 UP; 260/76; 260/78 UA; 260/79.5 C

[51] Int. Cl.² .................. C08F 22/40; C08F 30/02; C08F 222/40; C08F 122/40

[58] Field of Search ............ 260/2.5 N, 2.5 R, 47 P, 260/47 UA, 47 UP, 76 UA, 78 UA, 79.5 C

*Primary Examiner*—Joseph L. Schofer
*Assistant Examiner*—F. R. Cervi
*Attorney, Agent, or Firm*—Luther A. R. Hall

[57] ABSTRACT

A mixture which can be converted to a heat-resistant foamed plastic and which contains a solid blowing agent, a thermoplastic prepolymer of a polyimide of an unsaturated acid, an azomethine and a polyamine. On warming, the mixture gives a foamed plastic of high heat resistance and good resistance to chemicals.

40 Claims, No Drawings

MIXTURES CONTAINING PREPOLYMERS, WHICH CAN BE CONVERTED TO HEAT-RESISTANT FOAMED PLASTICS

The present invention relates to mixtures, containing prepolymers which can be converted to heat-resistant foamed plastics and give chemically resistant foamed plastics of high heat resistance, and to a process for the manufacture of heat-resistant foamed plastics.

U.S. Pat. Nos. 3,249,561 and 3,310,506 describe the manufacture of foamed plastics containing imide groups. For this purpose, however, it is necessary to prepare dilute solutions of polyamide-acids with very particular critical viscosities from the anhydrides of tetracarboxylic acids and from diamines, to introduce these into a particular mould, to free the product from the solvent after development of the foam structure at high temperatures (about 300°C) and to convert the product into a polyimide at higher temperatures with elimination of low molecular compounds.

This involved process furthermore has the disadvantage of process conditions which are difficult to control, such as, for example, a uniform temperature in the entire moulding during drying and during imide formation. As a result, the cyclisation can take place incompletely. Since the cyclisation and elimination of the low moleclar compounds takes place in a moulding which is already in the form of a foam, the structure of the foam, for example its density and pore size, can undergo uncontrollable or adverse changes.

U.S. Pat. No. 3,705,118 also describes the manufacture of mouldings containing imide groups. Here, a dilute solution of a polyamide-acid is again the starting material. It is only possible to manufacture thin foamed plastic articles. The properties of the foam already formed can subsequently undergo uncontrollable adverse changes as a result of the cyclisation of the polyamide-acid to the polyamide, that is to say as a result of the elimination of low molecular compounds.

German Offenlegungsschrift No. 2,253,753 describes the manufacture of a polyamide foam from polyfunctional aromatic carboxylic acid derivatives and organic polyisocyanates. The starting materials required to manufacture the foamed plastic can only be mixed immediately before its manufacture. The manufacturing process suffers from the disadvantages of a two-component process; the finished reaction mixture cannot be stored for a prolonged period before processing. The density of the foam is essentially determined by the amount of carbon dioxide produced. This in turn is influenced by the quantities of polyisocyanate and carboxylic acid derivative which are introduced into the mix.

According to German Auslegeschrift No. 1,912,551, polyimide foamed plastics are obtained by heating certain quantities of a polyamide-acid and a polyimide. The polyamide-acids are produced by reaction of a diamine with tetracarboxylic acid or certain derivatives of these. The disadvantages of this process is that the low molecular compounds split off during the cyclisation serve as blowing agents during foaming. The density of the foamed plastic is essentially determined by the amount of these elimination products. This quantity in turn is determined by the amount of polyamide-acid introduced into the mix. To manufacture reproducible foams, it is necessary to manufacture, and employ, polyamide-acids containing exactly the same quantities of volatile substances. Furthermore, the manufacture of the material of lower specific gravity in the B-state requires an involved process. In addition, the manufacture of the finished foamed article requires several hours' heating to at least 250°C.

French Patent No. 1,555,564 admittedly mentions the manufacture of a multicellular material from bis-maleimide and di-primary aromatic diamines; however, all data on the starting materials, the ratio in which they are mixed, the nature and amount of the blowing agent, the processing and the end properties is lacking. The system described is rather unsuitable for the manufacture of foamed plastics; even at 200°C, the curing is too slow relative to the foaming; the foam, once formed, again collapses before it has cured. Accordingly, products with very uneven pores, that is to say products with poor end properties, are produced.

The mixtures according to the invention give foamed plastics which do not suffer from the disadvantages mentioned.

They contain prepolymers of certain polyimides and azomethines and/or polyamines, these prepolymers being manufactured by heating the homogeneously mixed starting materials to 50° – 170°C, so that products which are still thermoplastic and foamable are produced. The period for which the components are warmed depends on the amount, the ratio and the nature of the components and also on the selected temperature and the desired physical properties of the prepolymers; as a rule, it is between 5 minutes and 10 hours. The prepolymers are then mixed with a solid blowing agent and optionally with a polyamine or azomethine and can thereafter be foamed, and cured, by heating.

Accordingly, a mixture according to the invention is characterised in that it contains (1) a prepolymer prepared by heating, to 50° – 170°C, a mixture containing (a) a diimide or triimide of the formula I

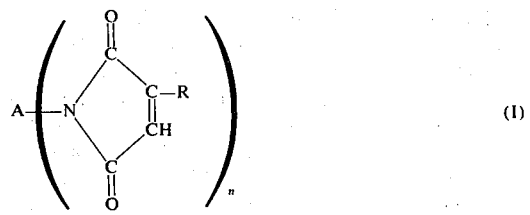

(I)

in which A denotes a n-valent organic radical with at least 2 and at most 30 carbon atoms, R denotes hydrogen or methyl and $n$ denotes 2 or 3 and (b) an azomethine of the formula II, III or IV

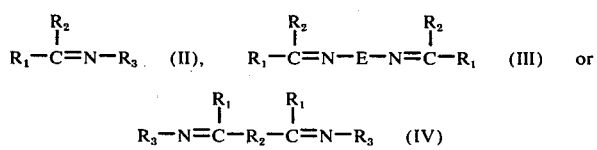

in which $R_1$ denotes a hydrogen atom, an aliphatic, cycloaliphatic, cycloaliphatic-aliphatic or aromatic radical with at most 12 carbon atoms, an araliphatic radical with at most 20 carbon atoms or a heterocyclic or heterocyclic-aliphatic radical, $R_2$ and $R_3$ have the same meaning as $R_1$, with the exception of hydrogen, and $R_1$ together with $R_2$ and with the inclusion of the carbon atom carrying the two substituents can also denote a cycloaliphatic ring system, and E represents a divalent organic radical with 2 to 30 carbon atoms, together with (2) a solid blowing agent for foaming and optionally (3) a polyamine of the formula V $$D-(NH_2)_y \qquad (V)$$

in which D denotes a y-valent organic radical with 2 to 40 carbon atoms and y denotes a number from 2 to 4.

A preferred mixture according to the invention is characterised in that it contains (1) a prepolymer prepared by warming, to 50° – 170°C, a mixture of (a) a diimide or triimide of the formula I, (b) an azomethine of the formula II, III or IV and (c) a polyamine of the formula V, together with (2) a solid blowing agent for foaming.

Finally, a further mixture according to the invention is characterised in that it contains (1) a prepolymer prepared by warming, to 50° – 170°C, a mixture of (a) a diimide or triimide of the formula I and (b) a polyamine of the formula V, together with (2) an azomethine of the formula II, III or IV and (3) a solid blowing agent.

The prepolymerisation can be effected by heating an intimate mixture of the solid starting materials or a solution or suspension of the starting materials. For the latter purpose it is possible to use substances which do not react with the starting materials and which, if desired, dissolve them sufficiently. Examples of such liquids are: dimethylformamide, tetramethyl urea, dimethylsulphoxide, N-methylpyrrolidone, dichloroethylene, tetrachloroethylene, tetrachloroethane, tetrabromoethane, chlorobenzene, dichlorobenzene, bromobenzene, dioxane or alkylated aromatic hydrocarbons.

The mixtures according to the invention can contain the starting compounds on which the prepolymers are based, in addition to the prepolymers prepared from them.

Furthermore, the mixtures according to the invention advantageously containing a kicker or activator for the blowing agent and/or a surface-active agent.

The polyimides of the formula I are a known category of compounds and can be prepared by using the methods described in U.S. Pat. No. 3,010,290 and in British Patent Specification No. 1,137,592, by reaction of the corresponding diamines or triamines with maleic anhydride or citraconic anhydride in a polar solvent and in the presence of a catalyst.

The symbol A in the formula I can denote a linear or branched alkylene radical with fewer than 20 carbon atoms, a phenylene radical, a cyclohexylene radical or a radical of the formula

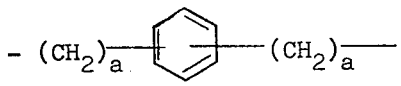

in which a represents an integer from 1 to 3.

The symbol A can also comprise several phenylene or cyclohexylene radicals which can be fused together, bonded by a simple valency bond or bonded via an atom or an inert group, such as, for example, oxygen atoms or sulphur atoms, alkylene groups with 1 to 3 carbon atoms or the following groups: —CO—, —SO$_2$—, —NR— (R=Alkyl), —N=N, —CONH—, —COO—, —CONH—A—NHCO— and O=P(O—)$_3$. Furthermore, the various phenylene or cyclohexylene radicals can be substituted by methyl groups or chlorine.

Preferred triimides or diimides of the formula I are those in which A in the formula I denotes an alkylene group with 2 to 20 carbon atoms, an aralkylene group with 8 to 12 carbon atoms, a cyclohexylene group or a phenylene group, and the phenylene and cyclohexylene groups can be substituted by methyl or chlorine and/or can be bonded to phenylene or cyclohexylene groups via a simple valency bond or via a bridge member.

Further preferred compounds of the formula I are those in which A denotes an aromatic radical with 6 – 30 carbon atoms, especially the p-phenylene group or two phenylene groups bonded to one another directly or via a methylene group or an oxygen atom.

Further possible polyimides are those of the formula I, in which A denotes a group of the formula VII or VIII

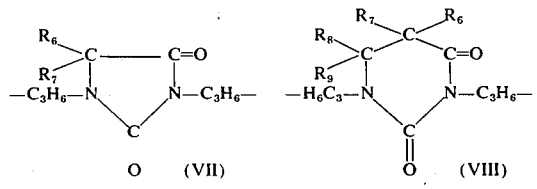

wherein $R_6$, $R_7$, $R_8$ and $R_9$ each denote hydrogen or alkyl groups with 1 to 6 carbon atoms and $R_6$ together with $R_7$ can also represent an alkylene group.

The following may be mentioned as special examples of polyimides of the formula I: N,N'-ethylene-bis-maleimide, N,N'-hexamethylene-bis-maleimide, N,N'-m-phenylene-bis-maleimide, N,N'-p-phenylene-bis-maleimide, N,N'-4,4'-diphenylmethane-bis-maleimide, N,N'-4,4'-3,3'-dichloro-diphenylmethane-bis-maleimide,N,N'-4,4'-diphenyl-ether-bis-maleimide, N,N'-4,4'-diphenylsulphone-bis-maleimide, N,N'-4,4'-dicyclohexylmethane-bis-maleimide, N,N'-α,α'-4,4'-dimethylenecyclohexane-bis-maleimide, N,N'-m-xylylene-bis-maleimide, N,N'-p-xylene-bis-maleimide, N,N'-4,4'-diphenylcyclohexane-bis-maleimide, N,N'-m-phenylene-bis-citraconimide, N,N'-4,4'-diphenylmethane-bis-citraconimide, N,N'-4,4'-2,2-diphenylpropane-bis-maleimide, N,N'-γ,γ'-1,3-dipropylene-5,5-dimethyl-hydantonin-bis-maleimide, the N,N'-bis-maleimide of 4,4'-diamino-triphenyl-phosphate and the N,N',N''-tris-maleimide of tris-(4-aminophenyl)-phosphate.

It is also possible to use mixtures of two or more of these polyimides.

The azomethines of the formulae II and III are a known category of compounds and can be prepared according to one of the known processes, such as are summarised, for example, in "Houben-Weyl", Methoden der organischen Chemie ("Methods of Organic Chemistry"), volume 11/2 (1958), page 73 et seq.

They are obtained, for example, by reacting aldehydes or ketones of the formula IX $$R_1-\underset{\underset{R_2}{|}}{C}=O \qquad (IX)$$

wherein $R_1$ and $R_2$ have the same meaning as in the formulae II and III, with monoamines of the formula X $$R_3-NH_2 \qquad (X)$$

or diamines of the formula XI $$H_2N-E-NH_2 \qquad (XI)$$

wherein $R_3$ and E have the same meaning as in formula II and III, in equivalent amounts and optionally in the presence of a catalyst.

The azomethines of the formula IV are also known compounds and are manufactured analogously by reacting dialdehydes or diketones of the formula XII $$O=\underset{\underset{R_1}{|}}{C}-R_2-C=O \qquad (XII)$$

wherein $R_1$ and $R_2$ have the same meaning as in the formula IV, with monoamines of the formula X in equivalent amounts and optionally in the presence of a catalyst.

In the azomethines of the formulae II, III and IV the radicals $R_1$, $R_2$ and $R_3$, where they denote an aliphatic or araliphatic radical, can also contain the grouping —O—, —SO$_2$—, —CONH— or —COO— in the hydrocarbon chain. Where the radicals $R_1$, $R_2$ and $R_3$ represent aliphatic, aromatic, araliphatic, cycloaliphatic, cycloaliphatic-aliphatic or heterocyclic radicals, these radicals can also be substituted by groups which do not have an adverse influence on the addition mechanism when the mixture is cured. The following may be mentioned as examples of such groups: halogen atoms, alkyl groups, alkoxy groups, —NO$_2$—, —CON(R)$_2$ or —COOR (R=Alkyl) and —SO$_2$. The heterocyclic and heterocyclic-aliphatic radical can contain the following hetero-atoms or hetero-groups: —O—, —SO$_2$—, —SO— and =N— or —NH—. Preferably, the heterocyclic radical denotes a N,N-heterocyclic radical.

The following should be mentioned in particular as carbonyl compounds of the formulae IX and XII for the preparation of the azomethines of the formula II, III and IV: acetaldehyde, propionaldehyde, isobutyraldehyde, butyraldehyde, capronaldehyde, capryaldehyde, caprinaldehyde, tetrahydrobenzaldehyde, hexahydrobenzaldehyde, furfuraldehyde, benzaldehyde, 2-methylbenzaldehyde, p-methoxy-benzaldehyde, β-naphthaldehyde, acetone, methyl ethyl ketone, dibutyl ketone, diheptyl ketone, didecyl ketone, dibenzyl ketone, acetophenone, butyrophenone, benzophenone, 2-methylacetophenone, 4-methoxypropiophenone, cyclopentanone, terephthalaldehyde, isophthaladehyde, glyoxal, glutaraldehyde and acetonylacetone.

The following may be mentioned in particular as monoamines of the formula X for the preparation of the azomethines of the formula III or VII: methylamine, butylamine, iso-butylamine, hexylamine, dodecylamine, cyclohexylamine, benzylamine, aniline, toluidine, α-naphthylamine and β-naphthylamine.

The following may be mentioned in particular as diamines of the formula XI for the preparation of the azomethine of the formula III: ethylenediamine, 1,6-hexamethylenediamine, 3,3,5-trimethyl-1,6-diaminohexane, isophoronediamine, m-phenylenediamine, p-phenylenediamine, 4,4'-diaminodiphenylmethane, 3,3'-dichloro-4,4'-diaminodiphenylmethane, 4,4'-diaminodiphenyl-ether, 4,4'-diaminodiphenylsulphone, 4,4'-diaminodicyclohexylmethane, m-xylylenediamine, p-xylylenediamine, 4,4'-diamino-1,1'-diphenylpropane and bis-(γ-amino-propyl)-5,5-dimethyl-hydantoin.

The following may be mentioned as special azomethines: 1,6-benzylidene-hexamethylenediamine and N,N'-benzylidenediaminophenylmethane, as well as N,N'-benzylidene-p-phenylenediamine, benzylidenebutylamine and benzalaniline.

The polyamines of the formula V are known compounds.

If the polyamine of the formula V is a di-primary polyamine, D in the formula V preferable has the same meaning as A in the formula I, and x denotes 2.

The following may be mentioned as examples of diamines of the formula V: 4,4'-diamino-dicyclohexylmethane, 1,4-diaminocyclohexane, m-phenylenediamine, p-phenylenediamine, 4,4'-diaminodiphenylmethane, bis-(4-aminophenyl)-2,2-propane, 4,4'-diaminodiphenyl-ether, 4,4'-diaminodiphenylsulphone, 1,5-diamino-naphthalene, m-xylylenediamine,p-xylylenediamine, p-xylenediamine, ethylenediamine, hexamethylenediamine, bis-(γ-amino-propyl)-5,5-dimethylhydantoin and 4,4'-diaminotriphenyl-phosphate.

The use of m-phenylenediamine, 4,4'-diaminodiphenylether, hexamethylenediamine, 4,4'-diaminotriphenyl-phosphate, and especially of 4,4'-diaminodiphenylmethane, is preferred.

Amongst the polyamines of the formula V other than the di-primary polyamines of the formula V, those which contain fewer than 40 carbon atoms and possess 3 or 4 NH$_2$— groups per molecule are used preferentially. The NH$_2$— groups can be bonded to a benzene ring, naphthalene ring, pyridine ring or triazine ring which is optionally substituted by methyl groups. They can also be bonded to several benzene rings which are bonded to one another by a simple valency bond, an atom or an inert group which has already been mentioned under the di-primary polyamines of the formula V, or by one of the following groups

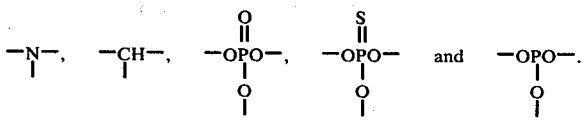

The following may be mentioned as examples of such polyamines: 1,2,4-triaminobenzene, 1,3,5-triaminobenzene, 2,4,6-triaminotoluene, 2,4,6-triamino-1,3,5-trimethylbenzene, 1,3,7-triaminonaphthalene, 2,4,4'-triaminodiphenyl, 3,4,6-triaminopyridine, 2,4,4'-triaminophenyl-ether, 2,4,4'-triaminophenyl-ether, 2,4,4'-triaminodiphenylmethane, 2,4,4'-triaminodiphenylsulphone, 2,4,4'-triaminobenzophenone, 2,4,4'-triamino-3-methyl-diphenylmethane, N,N,N-tri(4-aminophenyl)-amine, tri-(4-aminophenyl)methane, tri-(4-aminophenyl)-phosphate, tri- (4-aminophenyl)phosphite, tri-(4-aminophenyl)-thiophosphate, 3,5,4'-triaminobenzanilide, melamine, 3,5,3',5'-tetraaminobenzophenone, 1,2,4,5-tetraaminobenzene, 2,3,6,7-tetraaminonaphthalene, 3,3'-diaminobenzidine, 3,3',4,4'-tetraaminophenyl-ether, 3,3',4,4'-tetraaminodiphenylmethane, 3,3',4,4'-tetraaminodiphenylsulphone and 3,5-bis-(3,4'-diaminophenyl)-pyridine.

The use of tri-(4-aminophenyl)-phosphate and tri-(4-aminophenyl)-thiophosphate or of a mixture of these is preferred.

Further preferred polyamines are those of the formula

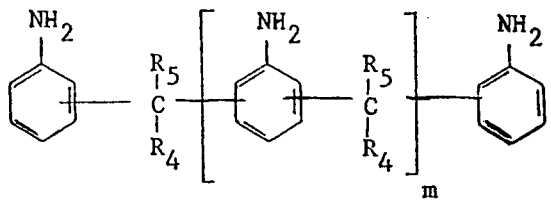

(VI)

in which $R_4$ and $R_5$ each denote hydrogen, alkyl, cycloalkyl, aryl or aralkyl or together denote an alkylene group.

The polyamines of the formula VI are also known compounds and can be obtained in accordance with the processes described in French Patent Specification Nos. 1,430,977 and 1,481,932 by reaction of primary aromatic amines with aldehydes or ketones.

Examples of aldehydes or ketones used for this purpose are formaldehyde, acetyldehyde, benzaldehyde, oenanthaldehyde, acetone, methyl ethyl ketone, cyclohexanone and acetophenone.

The ratio in which the polyimide of the formula I is mixed with the azomethine of the formulae II, III or IV can vary within a wide range. It is preferably so chosen that the reaction batch contains 2–6 equivalents of imide groups, preferably 2 – 3 equivalents of imide groups, per equivalent of >C=N— group. If, where appropriate, a polyamine of the formula V or VI is also added to the mixture to be foamed, the ratio in which the polyimide of the formula I, the polyamines of the formula V or VI and the azomethines of the formulae II, III and IV are mixed can vary within a wide range. The ratio of these 3 components is preferably so chosen that the reaction mixture for the preparation of the prepolymer contains 0.1 to 0.85 equivalent of primary amino group and 0.45 to 0.08 equivalent of >C=N— group per 1 equivalent of imide group, the sum of the equivalents of primary amino group and >C=N— group being 0.33 to 1.0 equivalent, peferably 1.0 equivalent, per 1 equivalent of imide group.

The curable mixture can also contain a prepolymer of several different polyimides, polyamines and azomethines.

Advantageously, a curable mixture according to the invention contains, in addition to a solid blowing agent for foaming, a prepolymer of (a) a triimide or diimide of the formula I, in which A denotes one of the groups

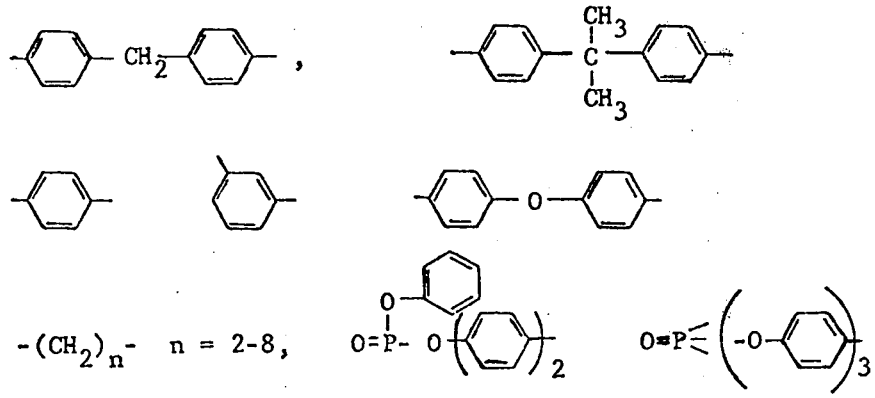

and R denotes hydrogen, and (b) an azomethine of the formula II or III, in which $R_1$ denotes hydrogen, $R_2$ and $R_3$ each denote a phenyl group and E denotes one of the following groups

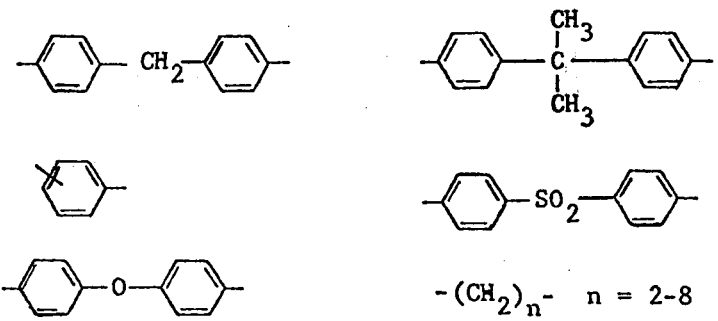

The prepolymer can also be prepared from (a) and (b) together with (c) a polyamine of the formula V, in which $y$ denotes the number 2 or 3.

To prepare the foam, blowing agents which are still solid at room temperature are added to the prepolymers or their mixtures with azomethines or polyamines. It is possible to use sulphonylhydrazides, for example benzenesulphonylhydrazide, p-toluenesulphonylhydrazide or 4,4'-oxy-dibenzenesulphonic acid hydrazide, and also substances such as azodicarboxylic acid amides or $\alpha,\alpha'$-azoisobutyronitrile. Preferably, azodicarboxylic acid amide is used as the blowing agent. The density of the new foams is largely determined by the weight ratio of reaction mixture to blowing agent; it can vary from 0.1 to 1.0. Preferably 0.5 – 7% of blowing agent are used.

To achieve a homogeneous pore structure, a surface-active substance can also be added, in amounts of 0.1 – 1% relative to the total amount of the reaction mixture.

The reactants should be ground as finely as possible and mixed as homogeneously as possible before being foamed. For example, the starting materials can be dissolved or suspended in a low-boiling medium, such as trichloromonofluoromethane (tradename "Freon 11"). After a homogeneous mixture has been formed, the medium is again removed completely. This process is particularly advisable if one reactant has a low melting point, when there is the danger of the material sticking together during grinding. Furthermore it is important that the prepolymers should be mixed thoroughly with the blowing agent and, where relevant, further reactants. The powder must have a homogeneous appearance. The blowing agent must not merely lie next to the matrix material but must be at least partially surrounded thereby.

An improvement in the pore structure, especially with regard to fineness of the pores, is achieved by tableting or granulating the powders obtained.

According to the invention, cured foamed articles are manufactured by warming a mixture according to the invention, which optionally contains a surface-active agent and/or a kicker or activator for the blowing agent, to 80° – 220°C.

For this purpose, the mixture is usually introduced into a mould which can be closed if necessary. The foaming, moulding and curing take place in an oven, preferably at 160° – 200°C, over the course of about ½ to 6 hours. The foamed plastic moulding formed can be taken out of the mould when it is dimensionally stable at the temperature used. If required, the moulding can be post-cured at the same temperature or at a higher temperature, in order thereby to achieve more advantageous properties in use.

The new foamed plastic articles have a high heat distortion point, good resistance to chemicals and good dielectric properties.

The new foamed plastic articles can be employed advantageously wherever a foamed material of good heat stability, high heat distortion point and good dielectric properties, even at fairly high temperatures, is required. Furthermore they can be used where the processing of the previous foamed plastics of high heat stability has entailed considerable difficulties in moulding and processing.

The foamed plastics according to the invention, and the process for their manufacture, exhibit several advantages over the known products. The starting material for the new foamed plastic already has the finished imide ring in the molecule. Accordingly, no cyclisation of the amide-acid grouping to the imide ring, with elimination of low molecular compounds, which would result in a subsequent uncontrollable or adverse change in the foam structure, takes place during curing. The blowing agent required for foaming is added to the mixture before it is cured.

A further advantage is that a finished one-component mixture can be employed for foaming and curing; the disadvantages inherent in a two-component process (two stock vessels, two metering installations and a mixing device) are thus circumvented. Furthermore, the finished mixture can be stored unchanged for a prolonged period of time. Depending on requirements, the finished mixture can be stored and processed as a fine powder, as granules or as pressed tablets. The use of the mixture as tablets or granules greatly simplifies processing.

The comparatively lower processing temperature, which in most cases is below 200°C, is also advantageous.

EXAMPLE 1

The following components are initially introduced into 1,500 ml of dioxane: 1,024 g of N,N'-4,4'-diphenylmethane-bis-maleimide, 226 g of diaminodiphenylmethane and 250 g of 1,6-benzylidene-hexamethylenediamine (corresponding to a molar ratio of 1:0.4:0.3).

A thick, yellow crystal paste results. The mixture is warmed, whereupon a dark brown, slightly turbid solution is produced. This solution is kept for 2 hours under reflux at 105°C.

After this time, 15 g of a silicone surface-active agent are added.

The mixture is cooled. A red-brown milky turbid oil results. This oil is introduced slowly into 12 liters of ice water whilst stirring well, whereupon a suspension results, into which 60 g of azodicarboxylic acid amide are stirred. The suspension is then filtered and dried in a circulating air cabinet at 30°C.

The resulting powder is a prepolymer and has a gelling time of 6 minutes 30 seconds at 160°C.

Tablets (7 g) are produced from the resulting powder; these tablets give foamed plastics of fine pore structure in closed or open moulds. The curing reaction is carried out for 1 hour at 160° – 200°C. The foamed plastics can be post-cured at 200° – 220°C. They have a glass transition temperature of about 230°C.

EXAMPLE 2

The following components are initially introduced into 600 ml of dioxane: 537 g of N,N'-4,4'-diphenylmethane-bis-maleimide, 79 g of diaminodiphenylmethane and 87 g of 1,6-benzylidene-hexamethylenediamine (corresponding to a molar ratio of 1.5:0.4:0.3).

When warmed, a clear light brown solution results. This is kept under reflux for one hour and then cooled.

After adding 6 g of a surface-active agent, the mixture is slowly introduced into 5 liters of ice water. 30 g of azodicarboxylic acid amide are added to the resulting suspension and are distributed well, whilst stirring.

Finally, the mixture is dried in a circulating air cabinet at 30°C.

The powder, a prepolymer, has the following gelling times: 4 minutes 35 seconds at 150°C, 2 minutes 3 seconds at 160°C and 1 minute 40 seconds at 170°C. The powder is pressed to form tablets. In closed moulds, these tablets give foams of uniform and fine pore structure under the following curing conditions: 1 hour at 160° – 190°C.

40 g of the resulting powder are thoroughly mixed with 0.5 g of cadmium stearate. Tablets weighing 7 g are pressed from this mixture. If such a tablet is heated in a closed warm mould of dimensions 3.5 × 6.5 × 1.5 cm to 185°C for 1 hour, a foamed plastic article having a fine uniform pore structure and a density of 0.2 g/cm$^3$ is produced.

EXAMPLE 3

A mixture of 1,024 g of N,N'-4,4'-diphenylmethane-bis-maleimide, 226 g of diaminodiphenylmethane and 250 g of 1,6-dibenzylidene-hexamethylenediamine in 1.5 l of dioxane is heated to the boil for 130 minutes. 15 g of foam stabiliser are added to the solution when cold. This mixture is added dropwise over the course of 15 minutes, with intensive stirring, to 12 liters of ice water containing 60 g of azodicarboxylic acid amide. The substance which has precipitated is filtered off and dried at 30°C.

A part of the substance is pressed to form tablets, and cured, as in Example 1. After curing for 1 hour at 60°C, a hard, fine-pored foamed article is obtained.

EXAMPLE 4

A mixture of 1,145 g of N,N'-4,4'-diphenylmethane-bis-maleimide, 169 g of diaminodiphenylmethane and 186 g of 1,6-di-benzylidene-hexamethylenediamine in 2.5 liters of dioxane is heated to the boil for 3 hours. 15 g of foam stabiliser are added to the solution when cold. This mixture is added dropwise over the course of 15 minutes, with intensive stirring, to 12 liters of ice water containing 60 g of azodicarboxylic acid amide.

The substance which has precipitated is filtered off and dried at 30°C. A part of the substance is tableted and cured, as in Example 1. After curing for 1 hour at 160° or 170° or 180° or 190°C, as desired, a hard, fine-pored foamed article is obtained.

EXAMPLE 5

71.6 g of N,N'-4,4'-diphenylmethane-bis-maleimide and 14.9 g of N,N'-dibenzylidene-diaminodiphenylmethane in 100 ml of dioxane are warmed to 80°C. A solution of 12.6 g of trimethylhexamethylenediamine in 100 ml of dioxane is added dropwise thereto and the mixture is warmed for a further 30 minutes to 75°–85°C. The resulting solution is added dropwise to 1 l of water while stirring and the powder which has precipitated is filtered off and dried. 40 g of the yellow powder thus obtained are thoroughly mixed with 2 g of azodicarboxylic acid amide, 1 g of tin stearate and 0.4 g of silicone oil and pressed to give tablets weighing 7 g. If such a tablet is heated to 250°C in a closed, warm mould (3.5 × 6.5 × 1.5 cm) for 1 hour, a hard moulded article of fine, uniform pore structure and density 0.2 g/cm$^3$ is produced.

EXAMPLE 6

4 g of azodicarboxylic acid amide and 1 g of a silicone foam stabiliser are added to a mixture consisting of 539 g (1.5 mols) of N,N'-4,4'-diphenylmethane-bis-maleimide, 60 g (0.3 mol) of diamino-diphenylmethane and 117 g (0.4 mol) of 1,6-dibenzylidene-hexamethylenediamine. This mixture is ground in a ball mill and is then worked in a kneader at 110°C for 15 minutes.

The (so-called) "advanced" product thus obtained is again ground. The resulting powder is very fine and has a gelling time of 1 minute 52 seconds at 180°C.

10 g of this powder are introduced into a mould prewarmed to 160°C. After curing for 1 hour at 160°C and 1 hour at 180°C, a foamed article of excellent surface and very fine pore structure is obtained. The foam has a density of 0.3 g/cm$^3$.

EXAMPLE 7

A mixture consisting of 130 g of N,N'-4,4'-diphenylmethane-bis-maleimide, 130 g of N,N'-2-ethyl-4,4'-diphenylmethane-bis-maleimide, 126 g of N,N'-2,2'-diethyl-4,4'-diphenylmethane-bis-maleimide, 99 g of tris-(p-aminophenyl)-phosphate and 57 g of terephthalaldehyde-dianiline is ground in a ball mill. The powder obtained is then (so-called) advanced for 2 hours and 15 minutes in a kneader at 140°C.

4 g of azodicarboxylic acid amide and 1 g of silicone foam stabiliser are added to 100 g of this mixture and the whole is mixed homogeneously in a mill.

10 g of the powder are introduced into a steel mould. The mould is closed and the powder is cured for 1 hour at 160°C and 1 hour at 180°C.

A foam of density 0.3 g/cm$^3$, which has a very attractive surface and a fine pore structure, is thus obtained.

EXAMPLE 8

A mixture consisting of 1 mol of tris-maleimide of tris-(4-aminophenyl)-phosphate, 0.5 mol of 4,4'-diaminodiphenyl-ether and 0.5 mol of benzalaniline is (so-called) advanced in a kneader for 1 hour and 45 minutes at 140°C. The resulting powder has a gelling time of 3 hours and 45 minutes at 180°C.

1% by weight of silicone foam stabiliser and 4% by weight of azodicarboxylic acid amide are admixed to the powder. 10 g of the powder are foamed in a steel mould at 160°C. The curing is subsequently terminated by heating to 180°C for a further hour.

The resulting foamed plastic has a uniform pore structure and a density of 0.3 g/cm$^3$.

EXAMPLE 9

2.5 mols of N,N'-4,4'-diphenylmethane-bis-maleimide and 1 mol of 1,6-dibenzylidene-hexamethylenediamine are (so-called) advanced for 3 hours in a kneader at 110°C. 10 minutes before the end of this treatment, 4 g of azodicarboxylic acid amide and 1 g of silicone foam stabiliser were added to the mixture. The product thus obtained is then ground in a ball mill. A fine and very homogeneous powder is obtained.

14 g of this product are introduced into a steel mould pre-warmed to 180°C. After curing for 1 hour at 180°C, a foamed plastic which has a fine pore structure is obtained. Its density is 0.4 g/cm$^3$.

EXAMPLE 10

A mixture consisting of 1 mol (358 g) of N,N'-4,4'-diphenylmethane-bis-maleimide and 0.2 mol (36.8 g) of diaminodiphenylmethane is treated for 30 minutes in a kneader at 160°C. 100 g of the resulting product are ground in a ball mill together with 28 g of N,N'-dibenzylidene-diaminodiphenylmethane, 0.8 g of silicone foam stabiliser and 4 g of azodicarboxylic acid amide. The resulting powder is very fine and homogeneous in appearance.

12 g of this powder are introduced into a steel mould pre-warmed to 180°C and left at this temperature for 2 hours.

After this curing time, a foamed article which is very hard and has a uniform pore structure and a density of 0.35 g/cm³ can be taken from the mould.

What we claim is:

1. A mixture which can be converted to a heat-resistant foamed plastic, characterised in that it contains (1) a thermoplastic prepolymer prepared by heating, to 50° – 170°C, a mixture containing (a) a diimide or triimide of the formula I

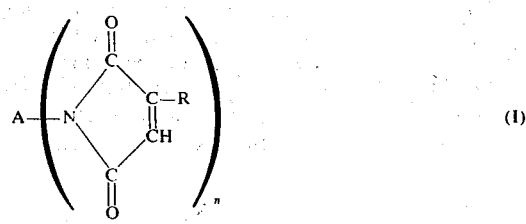

in which A denotes a $n$-valent organic radical with at least 2 and at most 30 carbon atoms, R denotes hydrogen or methyl and $n$ denotes 2 or 3 and (b) an azomethine of the formula II, III or IV

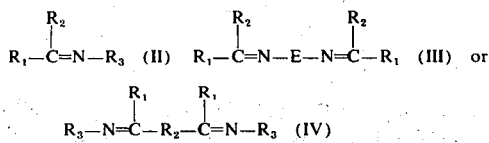

in which $R_1$ denotes a hydrogen atom, an aliphatic, cycloaliphatic, cycloaliphatic-aliphatic or aromatic radical with at most 12 carbon atoms, an araliphatic radical with at most 20 carbon atoms or a heterocyclic or heterocyclic-aliphatic radical, $R_2$ and $R_3$ have the same meaning as $R_1$, with the exception of hydrogen, and $R_1$ together with $R_2$ and with the inclusion of the carbon atom carrying the two substituents can also denote a cycloaliphatic ring system, and E represents a divalent organic radical with 2 to 30 carbon atoms, together with (2) a solid blowing agent for foaming and optionally (3) a polyamine of the formula V $$D-(NH_2)_y \quad (V)$$

in which D denotes a $y$-valent organic radical with 2 to 40 carbon atoms and $y$ denotes a number from 2 to 4.

2. A mixture which can be converted to a heat-resistant foamed plastic, according to claim 1, characterized in that it contains (1) a thermoplastic prepolymer prepared by heating, to 50° – 170°C, a mixture containing (a) a diimide or triimide of the formula I

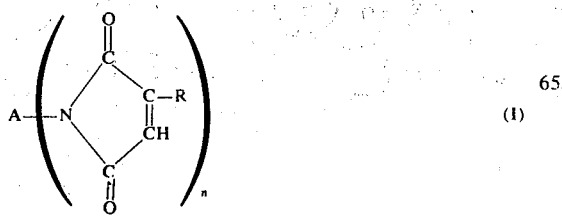

in which A denotes a $n$-valent organic radical with at least 2 and at most 30 carbon atoms, R denotes hydrogen or methyl and $n$ denotes 2 or 3 and (b) an azomethine of the formula II, III or IV

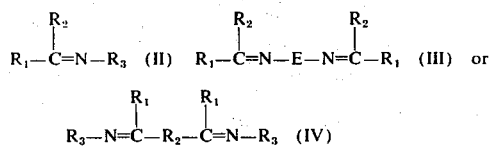

in which $R_1$ denotes a hydrogen atom, an aliphatic, cycloaliphatic, cycloaliphatic-aliphatic or aromatic radical with at most 12 carbon atoms, an araliphatic radical with at most 20 carbon atoms or a heterocyclic or heterocyclic-aliphatic radical, $R_2$ and $R_3$ have the same meaning as $R_1$, with the exception of hydrogen, and $R_1$ together with $R_2$ and with the inclusion of the carbon atom carrying the two substituents can also denote a cycloaliphatic ring system, and E represents a divalent organic radical with 2 to 30 carbon atoms, and (c) a polyamine of the formula V $$D-(NH_2)_y \quad (V)$$

in which D denotes a $y$-valent organic radical with 2 to 40 carbon atoms and $y$ denotes a number from 2 to 4, together with (2) a solid blowing agent for foaming.

3. A mixture which can be converted to a heat-resistant foamed plastic, characterised in that it contains (1) a thermoplastic prepolymer prepared by heating, to 50°–170°C, a mixture containing (a) a diimide or triimide of the formula I

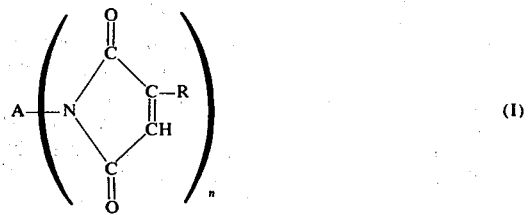

in which A denotes an $n$-valent organic radical with at least 2 and at most 30 carbon atoms, R denotes hydrogen or methyl and $n$ denotes 2 or 3 and (b) a polyamine of the formula V $$D-(NH_2)_y \quad (V)$$

in which D denotes a $y$-valent organic radical with 2 to 40 carbon atoms and $y$ denotes a number from 2 to 4, together with (2) an azomethine of the formula II, III or IV

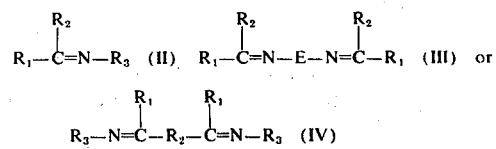

in which R₁ denotes a hydrogen atom, an aliphatic, cycloaliphatic, cycloaliphatic-aliphatic or aromatic radical with at most 12 carbon atoms, an araliphatic radical with at most 20 carbon atoms or a heterocyclic or heterocyclic-aliphatic radical, R₂ and R₃ have the same meaning as R₁, with the exception of hydrogen, and R₁ together with R₂ and with the inclusion of the carbon atom carrying the two substituents can also denote a cycloaliphatic ring system, and E represents a divalent organic radical with 2 to 30 carbon atoms, and (3) a solid blowing agent for foaming.

4. A mixture according to claim 1, characterised in that in addition to the indicated constituents it also contains a surface-active agent and/or a kicker or activator for the blowing agent.

5. A mixture according to claim 1, characterised in that it contains a prepolymer, prepared from a triimide or diimide of the formula I, in which A denotes an alkylene group with 2 to 20 carbon atoms, an aralkylene group with 8 to 12 carbon atoms, a cyclohexylene group or a phenylene group, and the phenylene and cyclohexylene groups can be substituted by methyl or chlorine and/or can be bonded to phenylene or cyclohexylene groups via a simple valency bond or via a bridge member.

6. A mixture according to claim 1, characterised in that it contains a prepolymer, prepared from a diimide or triimide of the formula I, in which A denotes an aromatic radical with 6 – 20 carbon atoms.

7. A mixture according to claim 6, characterised in that it contains a prepolymer, prepared from a diimide of the formula I, in which A denotes the p-phenylene group or two phenylene groups bonded to one another directly or via a methylene group or an oxygen atom.

8. A mixture according to claim 1, characterised in that it contains a prepolymer for the preparation of which 1,6-benzylidene-hexamethylenediamine or N,N'-benzylidene-diaminodiphenylmethane is used as the azomethine.

9. A mixture according to claim 3, characterised in that it contains 1,6-benzylidene-hexamethylenediamine or N,N'-benzylidene-diaminodiphenylmethane as the azomethine.

10. A mixture according to claim 2, characterised in that it contains a prepolymer for the preparation of which a polyamine of the formula VI

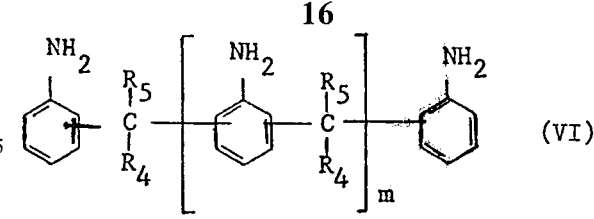

in which R₄ and R₅ each denotes hydrogen, alkyl, cycloalkyl, aryl or aralkyl or together denote an alkylene group, is used as the polyamine.

11. A mixture according to claim 2, characterised in that it contains a prepolymer for the preparation of which 4,4'-diaminodiphenylmethane, tri-(4-aminophenyl)-phosphate or tri-(4-aminophenyl)-thiophosphate is used.

12. Mixture according to claim 1, characterised in that it contains, as the polyamine of the formula V, a polyamine of the formula VI

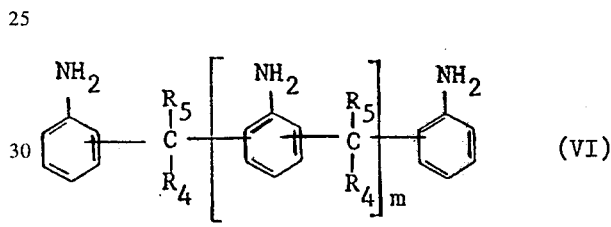

in which R₄ and R₅ each denotes hydrogen, alkyl, cycloalkyl, aryl or aralkyl or together denote an alkylene group.

13. A mixture according to claim 1, characterised in that it contains 4,4'-diaminodiphenylmethane, tri-(4-aminophenyl)-phosphate or tri-(4-aminophenyl)-thiophosphate as the polyamine of the formula V.

14. A mixture according to claim 1, characterised in that it contains a prepolymer of (a) a triimide or diimide of the formula I, in which A denotes one of the following groups:

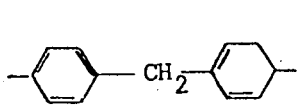   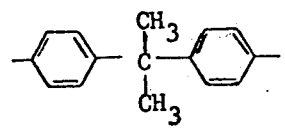

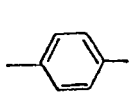      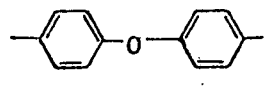

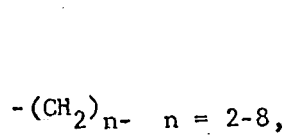   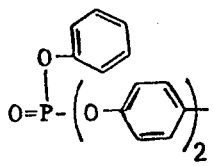   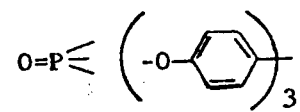

and R denotes hydrogen, and (b) an azomethine of the formula II or III, in which R₁ denotes hydrogen, R₂ and R₃ each denotes a phenyl group and E denotes one of the following groups

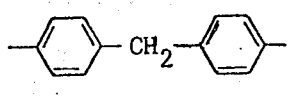

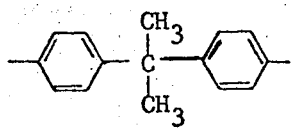

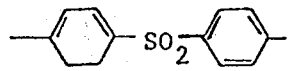

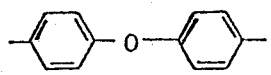

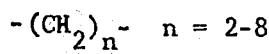 n = 2-8 and optionally (c) a polyamine of the formula V, in which y represents the number 2 or 3.

15. A process for the preparation of heat-resistant foams, characterised in that a mixture containing (1) a thermoplastic prepolymer obtained from a mixture containing (a) a diimide or triimide of the formula I

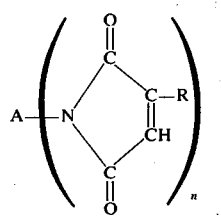 (I)

in which A denotes a n-valent organic radical with at least 2 and at most 30 carbon atoms, R denotes hydrogen or methyl and n denotes 2 or 3 and (b) an azomethine of the formula II, III or IV

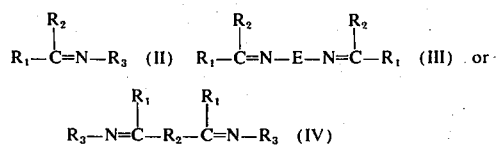

in which R₁ denotes a hydrogen atom, an aliphatic, cycloaliphatic, cycloaliphatic-aliphatic or aromatic radical with at most 12 carbon atoms, an araliphatic radical with at most 20 carbon atoms or a heterocyclic or heterocyclic-aliphatic radical, R₂ and R₃ have the same meaning as R₁, with the exception of hydrogen, and R₁ together with R₂ and with the inclusion of the carbon atom carrying the two substituents can also denote a cycloaliphatic ring system, and E represents a divalent organic radical with 2 to 30 carbon atoms, which has been warmed to 50° - 170°C, and (2) a solid blowing agent for foaming and optionally (3) a polyamine of the formula V

 (V)

in which D denotes a y-valent organic radical with 2 to 40 carbon atoms and y denotes a number from 2 to 4, is warmed to a temperature of 80° - 120°C.

16. A process according to claim 15 for the preparation of heat-resistant foamed plastics, characterised in that a mixture containing (1) a thermoplastic prepolymer prepared from (a) a diimide or triimide of the formula I

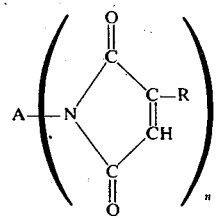 (I)

in which A denotes a n-valent organic radical with at least 2 and at most 30 carbon atoms, R denotes hydrogen or methyl and n denotes 2 or 3 and (b) an azomethine of the formula II, III or IV.

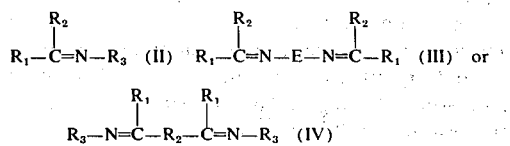

in which R₁ denotes a hydrogen atom, an aliphatic, cycloaliphatic, cycloaliphatic-aliphatic or aromatic radical with at most 12 carbon atoms, an araliphatic radical with at most 20 carbon atoms or a heterocyclic or heterocyclic-aliphatic radical, R₂ and R₃ have the same meaning as R₁, with the exception of hydrogen, and R₁ together with R₂ and with the inclusion of the carbon atom carrying the two sustituents can also denote a cycloaliphatic ring system, and E represents a divalent organic radical with 2 to 30 carbon atoms, and (c) a polyamine of the formula V

 (V)

in which D denotes a y-valent organic radical with 2 to 40 carbon atoms and y denotes a number from 2 to 4, by warming to 50° - 170°C, and (2) a solid blowing agent for foaming, is warmed to a temperature of 80° - 220°C.

17. A process for the preparation of heat-resistant foamed plastics, characterised in that a mixture containing (1) a thermoplastic prepolymer prepared from (a) a diimide or triimide of the formula I

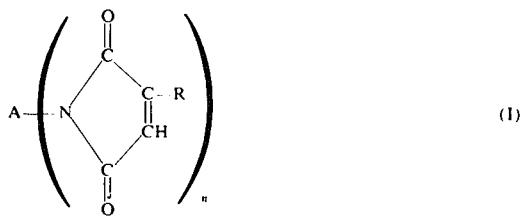

in which A denotes a $n$-valent organic radical with at least 2 and at most 30 carbon atoms, R denotes hydrogen or methyl and n denotes 2 or 3 and b) a polyamine of the formula V

in which D denotes a $y$-valent organic radical with 2 to 40 carbon atoms and y denotes a number from 2 to 4, by warming the components to 50° – 170°C, and (2) an azomethine of the formula II, III or IV

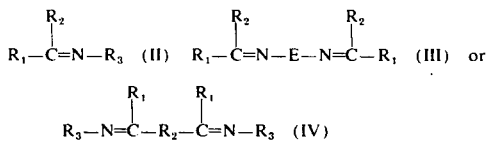

in which $R_1$ denotes a hydrogen atom, an aliphatic, cycloaliphatic, cycloaliphatic-aliphatic or aromatic radical with at most 12 carbon atoms, an araliphatic radical with at most 20 carbon atoms or a heterocyclic or heterocyclic-aliphatic radical, $R_2$ and $R_3$ have the same meaning as $R_1$, with the exception of hydrogen, and $R_1$ together with $R_2$ and with the inclusion of the carbon atom carrying the two substituents can also denote a cycloaliphatic ring system, and E represents a divalent organic radical with 2 to 30 carbon atoms, and (3) a solid blowing agent for foaming, is warmed to a temperature of 80° – 220°C.

18. A process according to claim 15, characterised in that the mixture is warmed to 160° – 200°C.

19. Process according to claim 15, characterised in that a mixture which in addition to the indicated constituents also contains a surface-active agent and/or a kicker or activator for the blowing agent is warmed.

20. A process according to claim 15, characterised in that a mixture of which the prepolymer is prepared from a mixture containing, as the diimide or triimide, a compound of the formula I, in which A denotes an alkylene group with 2 to 20 carbon atoms, an aralkylene group with 8 to 12 carbon atoms, a cyclohexylene group or a phenylene group, and the phenylene and cyclohexylene groups can be substituted by methyl or chlorine and/or can be bonded to phenylene or cyclohexylene groups via a siple valency bond or via a bridge member, is warmed.

21. A process according to claim 15, characterised in that a mixture of which the prepolymer is prepared from a mixture containing, as the diimide or triimide, a compound of the formula I, in which A denotes an aromatic radical with 6 – 20 carbon atoms, is warmed.

22. A process according to claim 21, characterised in that a mixture of which the prepolymer is prepared from a mixture containing, as the diimide, a compound of the formula I, in which A denotes the p-phenylene group or two phenylene groups bonded to one another directly or via a methylene group or an oxygen atom, is warmed.

23. A process according to claim 15, characterised in that a mixture containing a prepolymer for the preparation of which 1,6-benzylidene-hexamethylenediamine or N,N'-benzylidene-diaminodiphenylmethane is used as the azomethine, is warmed.

24. A process according to claim 17, characterised in that a mixture which contains 1,6-benzylidene-hexamethylenediamine or N,N'-benzylidene-diaminodiphenylmethane as the azomethine is warmed.

25. A process according to claim 16, characterised in that a mixture which contains a prepolymer, for the preparation of which the polyamine used is a polyamine of the formula VI

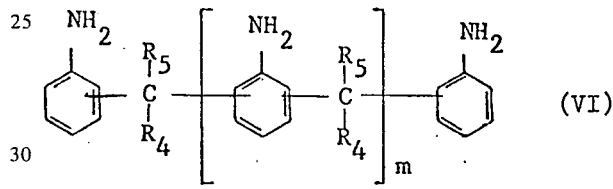

in which $R_4$ and $R_5$ each denotes hydrogen, alkyl, cycloalkyl, aryl or aralkyl or together denote an alkylene group, is warmed.

26. Process according to claim 16, characterised in that a mixture which contains a prepolymer, for the preparation of which 4,4'-diaminodiphenylmethane, tri-(4-aminophenyl)-phosphate or tri-(4-aminophenyl)-thiophosphate is used as the polyamine of the formula V, is warmed.

27. Process according to claim 5, characterised in that a mixture which contains, as the polyamine, a polyamine of the formula VI

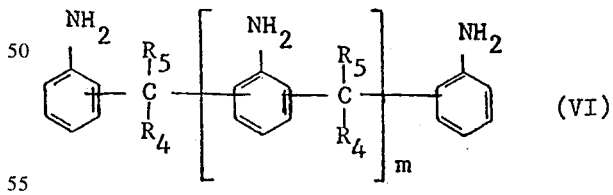

in which $R_4$ and $R_5$ each denotes hydrogen, alkyl, cycloalkyl, aryl or aralkyl or together denote an alkylene group, is warmed.

28. Process according to claim 15, characterised in that a mixture which contains 4,4'-diaminodiphenylmethane, tri-(4-aminophenyl)-phosphate or tri-(4-aminophenyl)-thiophosphate as the polyamine of the formula V is warmed.

29. Process according to claim 15, characterised in that a mixture which contains a prepolymer prepared from (a) a triimide or diimide of the formula I, in which A denotes one of the following groups

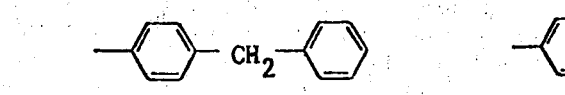

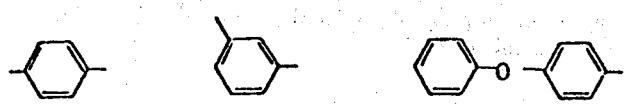

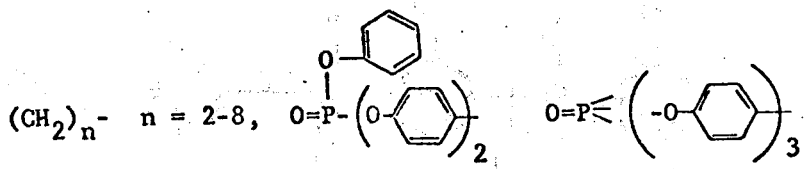

and R denotes hydrogen and (b) an azomethine of the formula II or III, in which $R_1$ denotes hydrogen, $R_2$ and $R_3$ each denotes a phenyl group and E denotes one of the following groups or diimide of the formula I, in which A denotes an alkylene group with 2 to 20 carbon atoms, an aralkylene group with 8 to 12 carbon atoms, a cyclohexylene group or a phenylene group, and the phenylene and cyclohexylene groups can be substituted by methyl or chlorine and/or can be bonded to phenylene or cyclo-

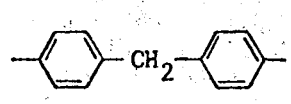

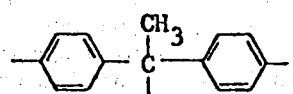

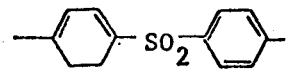

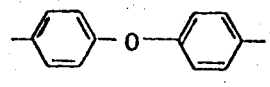

and optionally a polyamine of the formula V, in which y denotes the number 2 or 3, is warmed.

hexylene groups via a simple valency bond or via a bridge member.

30. A mixture according to claim 3 characterised in that in addition to the indicated constituents it also contains a surface-active agent and/or a kicker or activator for the blowing agent.

31. A mixture according to claim 3, characterised in that it contains a prepolymer, prepared from a triimide

32. A mixture according to claim 3, characterised in that it contains a prepolymer, prepared from a diimide or triimide of the formula I, in which A denotes an aromatic radical with 6 – 20 carbon atoms.

33. A mixture according to claim 3, characterised in that it contains a prepolymer for the preparation of which a polyamine of the formula VI

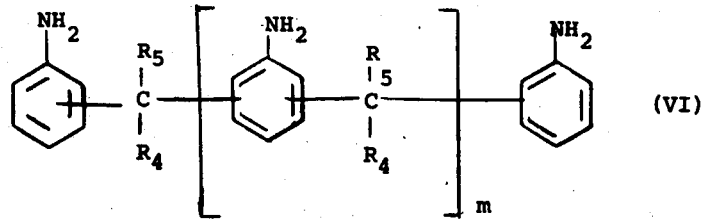

(VI)

in which $R_4$ and $R_5$ each denotes hydrogen, alkyl, cycloalkyl, aryl or aralkyl or together denote an alkylene group, is used as the polyamine.

34. A mixture according to claim 3, characterised in that it contains a prepolymer for the preparation of which 4,4'-diaminodiphenylmethane, tri-(4-aminophenyl)-phosphate or tri-(4-aminophenyl)-thiophosphate is used.

35. A process according to claim 17, characterised in that the mixture is warmed to 160°–200°C.

36. A process according to claim 17, characterised in that a mixture which in addition to the indicated constituents also contains a surface-active agent and/or a kicker or activator for the blowing agent is warmed.

37. A process according to claim 17, characterised in that a mixture of which the prepolymer is prepared from a mixture containing, as the diimide or triimide, a compound of the formula I, in which A denotes an alkylene group with 2 to 20 carbon atoms, an aralkylene group with 8 to 12 carbon atoms, a cyclohexylene group or a phenylene group, and the phenylene and cyclohexylene groups can be substituted by methyl or chlorine and/or can be bonded to phenylene or cyclohexylene groups via a simple valency bond or via a bridge member, is warmed.

38. A process according to claim 17, characterised in that a mixture of which the prepolymer is prepared from a mixture containing, as the diimide or triimide, a compound of the formula I, in which A denotes an aromatic radical with 6–20 carbon atoms, is warmed.

39. A process according to claim 17, characterised in that a mixture which contains a prepolymer, for the preparation of which the polyamine used is a polyamine of the formula VI

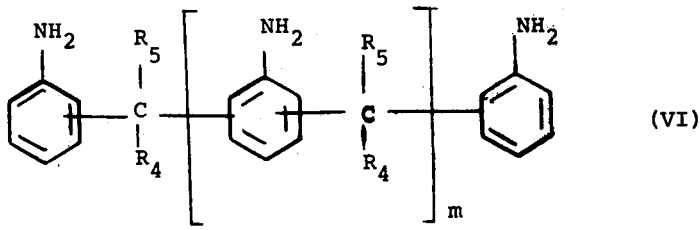

(VI)

in which $R_4$ and $R_5$ each denotes hydrogen, alkyl cycloalkyl, aryl or aralkyl or together denote an alkylene group, is warmed.

40. A process according to claim 17, characterised in that a mixture which contains a prepolymer, for the preparation of which 4,4'-diaminodiphenylmethane, tri-(4-aminophenyl)-phosphate or tri-(4-aminophenyl)-thiophosphate is used as the polyamine of the formula V, is warmed.

* * * * *